(12) United States Patent
Livingston et al.

(10) Patent No.: US 8,221,085 B2
(45) Date of Patent: Jul. 17, 2012

(54) WIND BLADE JOINT BONDING GRID

(75) Inventors: Jamie T. Livingston, Simpsonville, SC (US); Howard Driver, Greer, SC (US)

(73) Assignee: General Electric Company, Schenectady, NY (US)

( * ) Notice: Subject to any disclaimer, the term of this patent is extended or adjusted under 35 U.S.C. 154(b) by 1250 days.

(21) Appl. No.: 11/955,728

(22) Filed: Dec. 13, 2007

(65) Prior Publication Data
US 2009/0155084 A1    Jun. 18, 2009

(51) Int. Cl.
*F03D 1/06*    (2006.01)
*F03D 11/00*    (2006.01)

(52) U.S. Cl. ............... 416/226; 416/229 R; 416/233; 29/889.71; 29/889.72; 156/304.1; 156/304.2; 156/304.3; 156/304.5; 156/291; 156/292

(58) Field of Classification Search ............... 416/224, 416/226, 229 R, 230, 232, 233, 241 A; 29/889.7, 29/889.71, 889.72; 156/304.1, 304.2, 304.3, 156/304.5, 291, 292
See application file for complete search history.

(56) References Cited

U.S. PATENT DOCUMENTS

| 3,481,810 | A  | * | 12/1969 | Waite ..................... 156/304.1 |
| 4,450,038 | A  | * | 5/1984  | Ishii et al. ............... 156/304.1 |
| 6,282,786 | B1 | * | 9/2001  | Evans et al. ............... 29/889.72 |
| 6,287,080 | B1 | * | 9/2001  | Evans et al. ............... 416/229 A |
| 6,454,536 | B1 | * | 9/2002  | Evans et al. ............... 416/229 A |
| 7,654,799 | B2 | * | 2/2010  | Eyb ..................... 416/229 R |
| 2007/0140858 | A1 |  | 6/2007  | Bakhuis et al. |
| 2007/0243387 | A1 | * | 10/2007 | Lin et al. ............... 156/272.2 |

* cited by examiner

*Primary Examiner* — Christopher Verdier
(74) *Attorney, Agent, or Firm* — McNees Wallace & Nurick LLC

(57) ABSTRACT

A method and system for assembling large wind turbine blades that includes providing a plurality of wind turbine blade segments. An adhesive distribution arrangement is disposed on a surface of at least one of the plurality of the wind turbine blade segments. The adhesive distribution arrangement includes a bonding grid having a plurality of adhesive distribution openings. The wind turbine blade segments are directed together and sufficient adhesive is provided to the bonding grid to substantially fill an area between the wind turbine segments. The adhesive is then cured to form a bonded joint, the bonding grid being incorporated into the bonded joint. A bonding grid for use with the method and system and a segmented wind turbine blade are also disclosed.

18 Claims, 7 Drawing Sheets

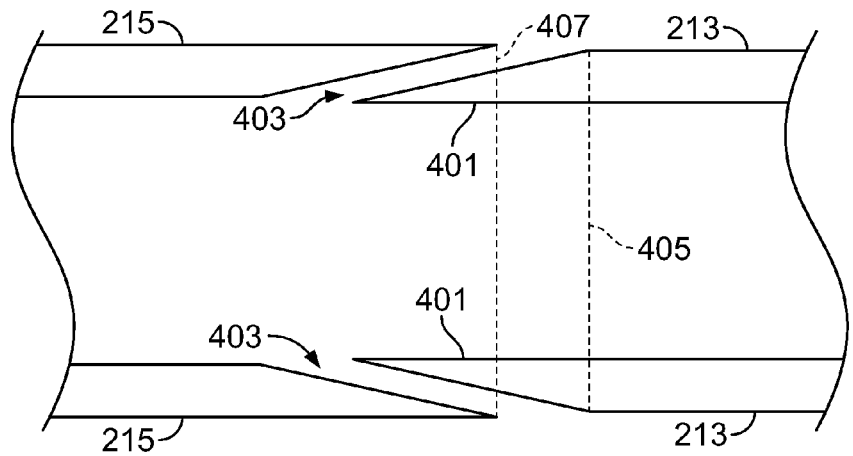
FIG. 5
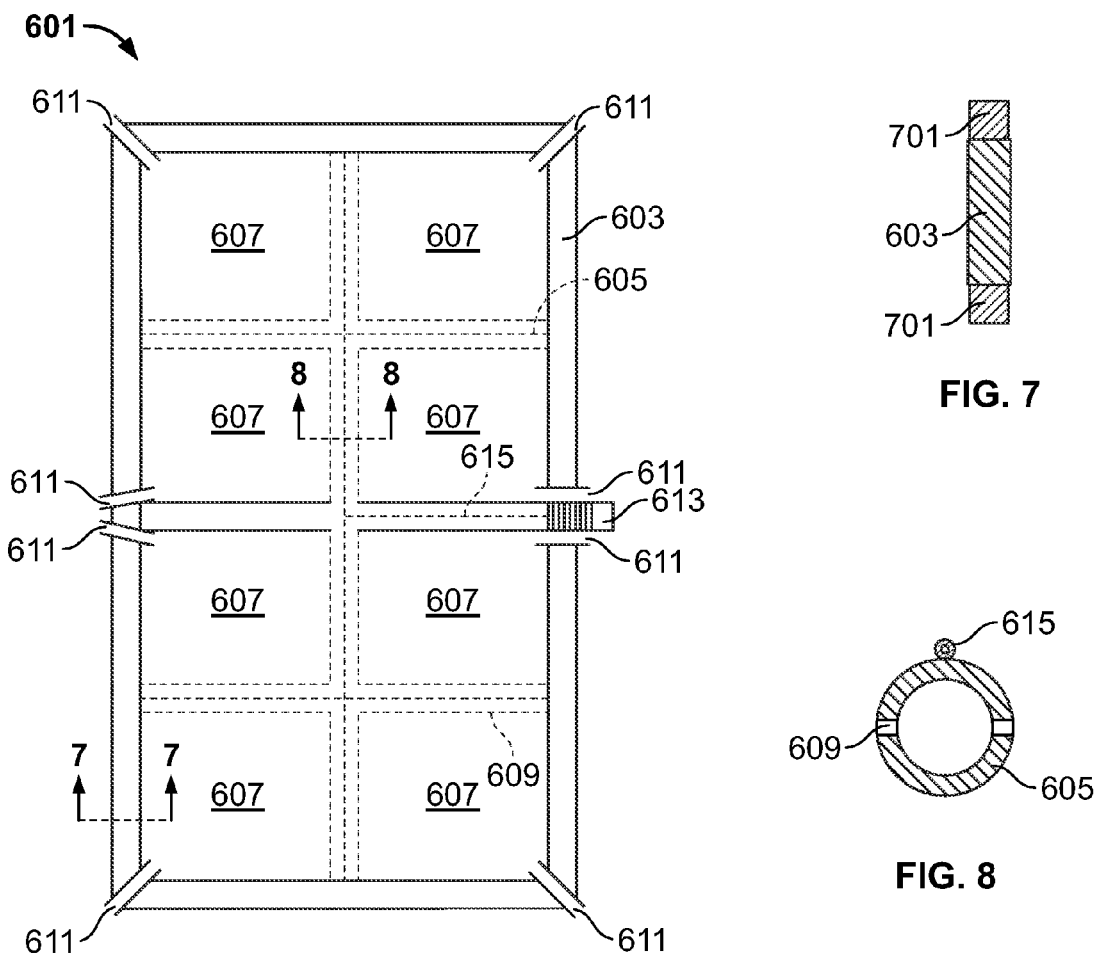
FIG. 6
FIG. 7
FIG. 8

WIND BLADE JOINT BONDING GRID

FIELD OF THE INVENTION

The present invention is directed to elongated airfoils for use with wind turbines and methods for fabricating elongated airfoils for wind turbines. In particular, the present invention is directed to segmented wind turbine blades and methods for making large, elongated wind turbine blades.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple wind turbine blades. The wind turbine blades are elongated airfoils configured to provide rotational forces in response to wind. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height.

Wind turbine blades may be very large and may require fabrication in two or more pieces. Segmented components provide ease of transportation but require joining of the segments together by bonding in order to fabricate the full turbine blade. The components may be joined together by adhesive or interlocking structure, but conventional joining techniques fail to provide sufficient bonding strength or sufficient durability between sections during wind turbine operation. In addition, known interlocking systems and/or bonding systems require heavy and/or expensive components that result in undesirable weight in the assembled wind turbine blade.

Further, due to the large size of the components and the necessity for a strong bond, good distribution of adhesive is required. Currently there is no method of system that provides sufficiently uniform distribution of adhesive to join wind turbine blade segments.

What is needed is an improved method and system for fabricating large segmented wind turbine blades that includes durable and strong bonding joints that do not suffer from the drawbacks of known systems.

SUMMARY OF THE INVENTION

A first aspect of the present invention includes a method and system for assembling large wind turbine blades that includes providing a plurality of wind turbine blade segments. An adhesive distribution arrangement is disposed on a surface of at least one of the plurality of the wind turbine blade segments. The adhesive distribution arrangement includes a bonding grid having a plurality of adhesive distribution openings. The wind turbine blade segments are directed together and sufficient adhesive is provided to the bonding grid to substantially fill an area between the wind turbine segments. The adhesive is then cured to form a bonded joint, the bonding grid being incorporated into the bonded joint.

Another aspect of the present invention includes an adhesive distribution arrangement for assembling large wind turbine blades. The arrangement includes a bonding grid having a port for receiving adhesive and a frame, the bonding grid being configured to deliver adhesive to a plurality of adhesive distribution openings. The distribution openings are configured to distribute adhesive onto one or more surfaces of a wind turbine blade segment.

Still another aspect of the present invention includes a segmented wind turbine blade. The segmented wind turbine blade includes a first wind turbine blade segment and a second wind turbine blade segment. The first wind turbine blade segment is joined to the second wind turbine blade segment. A bonding grid is disposed between adjacent surfaces of the first wind turbine blade segment and the second wind turbine blade segment. The bonding grid includes a frame having a plurality of cells disposed therein, where the cells are substantially filled with cured adhesive. The distribution of adhesive is substantially uniform across the adjacent surfaces.

One advantage of an embodiment is that the bonding grid provides controlled temperature and distribution of adhesive, and provides a quality control to validate the filling of the cavity.

Another advantage is that the bonding grid provides a means of controlling the space between joined components to provide strong and uniform junctions between segments.

Still another advantage is that the adhesive is distributed substantially uniformly across the bonding grid allowing for the formation of a strong uniform joint.

Still another advantage is that the segmented wind turbine blades may be shipped at a substantially reduced cost and easily assembled on-site.

Still another advantage is that the method and system of the disclosure enables bonding in a wide variety of environments.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 shows a cross-sectional view of two wind turbine blade segments being directed together according to an embodiment of the present disclosure.

FIG. 6 shows a top view of a bonding grid according to an embodiment of the present disclosure.

FIG. 7 shows a cross-sectional view taken in direction 7-7 of FIG. 6.

FIG. 8 shows a cross-sectional view taken in direction 8-8 of FIG. 6.

Wherever possible, the same reference numbers will be used throughout the drawings to refer to the same or like parts.

DETAILED DESCRIPTION OF THE INVENTION

Figure 1:
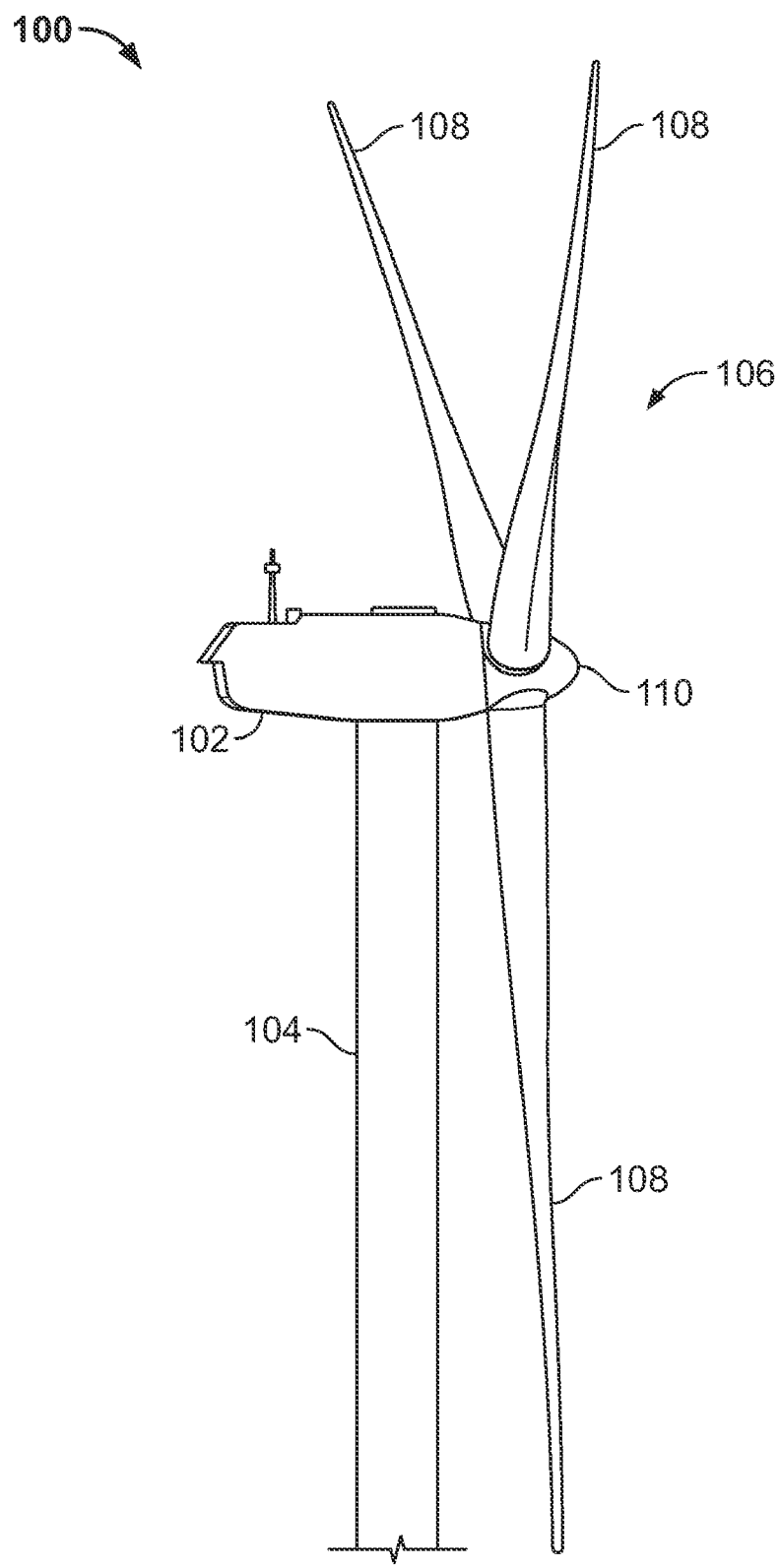
FIG. 1 shows a side elevational view of a wind turbine according to an embodiment of the present disclosure.

FIG. 1 shows a wind turbine 100 having a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present disclosure.

Figure 2:
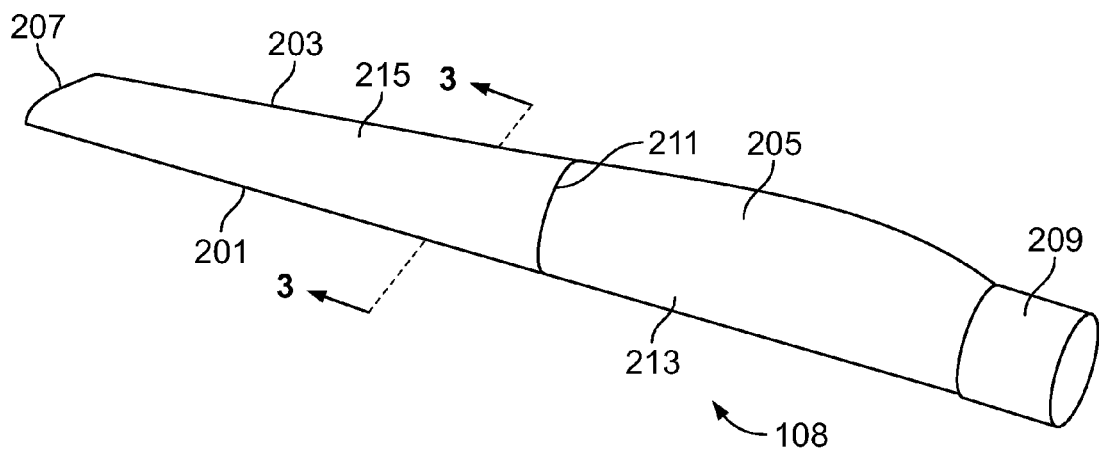
FIG. 2 shows a top perspective view of a wind turbine blade according to an embodiment of the present disclosure.

FIG. 2 illustrates a turbine blade 108 according to an embodiment of the present disclosure having a leading edge 201 and a trailing edge 203. The turbine blade 108 includes an airfoil portion 205 extending from the tip 207 to the root 209, which is connectable to the hub 110 of the wind turbine. The blade includes a bonded joint 211 dividing a first segment 213 of the blade 108 from the second segment 215 of the blade 108. The first segment 213 and the second segment 215 are segments of the blade 108, which are assembled together to provide a complete blade 108. By segment, it is meant that the wind turbine blade 108 is divided into a plurality of components that, when assembled together, form a complete blade 108. Although FIG. 2 shows a blade 108 having two segments, the disclosure is not limited to two segments. For example, blade 108 may be divided into any number of segments including three or more segments.

Figure 3:
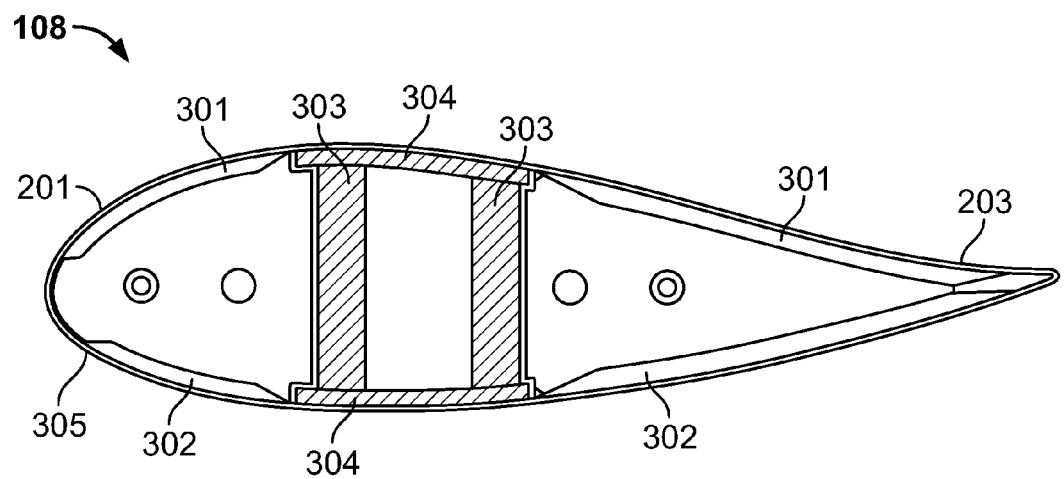
FIG. 3 shows a cross-sectional view of a wind turbine blade taken in direction 3-3 of FIG. 2.

FIG. 3 illustrates a cross-sectional view taken in direction 3-3 of the wind turbine blade 108 of FIG. 2. FIG. 3 is a cross-section of a wind turbine blade taken along line 3-3 of FIG. 2. The wind turbine blade 108 includes a first shell portion 301 and a second shell portion 302, which are each adhesively or otherwise bonded to a spar cap 304. In other embodiments, the first shell portion 301 and the second shell portion 302 may be a unitary component. The spar cap 304 may be adhesively or otherwise bonded to the shear webs 303. In addition, the spar cap 304 and the second shell portion 302 are adhesively or otherwise bonded. The shear web 303, the spar cap 304 and the first and second shell portions 301, 302 may adhered using an adhesive or other suitable joining structure. An outer skin 305 or coating may be applied to the outer surfaces of the blade 108 to provide additional structural support and to aid in aerodynamic performance. In addition, other structures known in the art for wind turbine blade 108 design, such as stiffeners, fasteners or other hardware or structures may be present in the blade 108. Other arrangements of shear web 303 and spar cap 304 may be provided including varied geometries of support. For example, the shear web 303 and spar cap 304 may be arranged into a box geometry, and "I" geometry, a "T" geometry or any other suitable geometry that provides internal support between the first shell portion 301 and the second shell portion 302. Further still, the shear web 303 may be arranged as shown and described in the modular interlocking blade configuration in U.S. Patent Publication US2007/0140858 to Bakhuis et al., which is herein incorporated by reference in its entirety.

Figure 4:
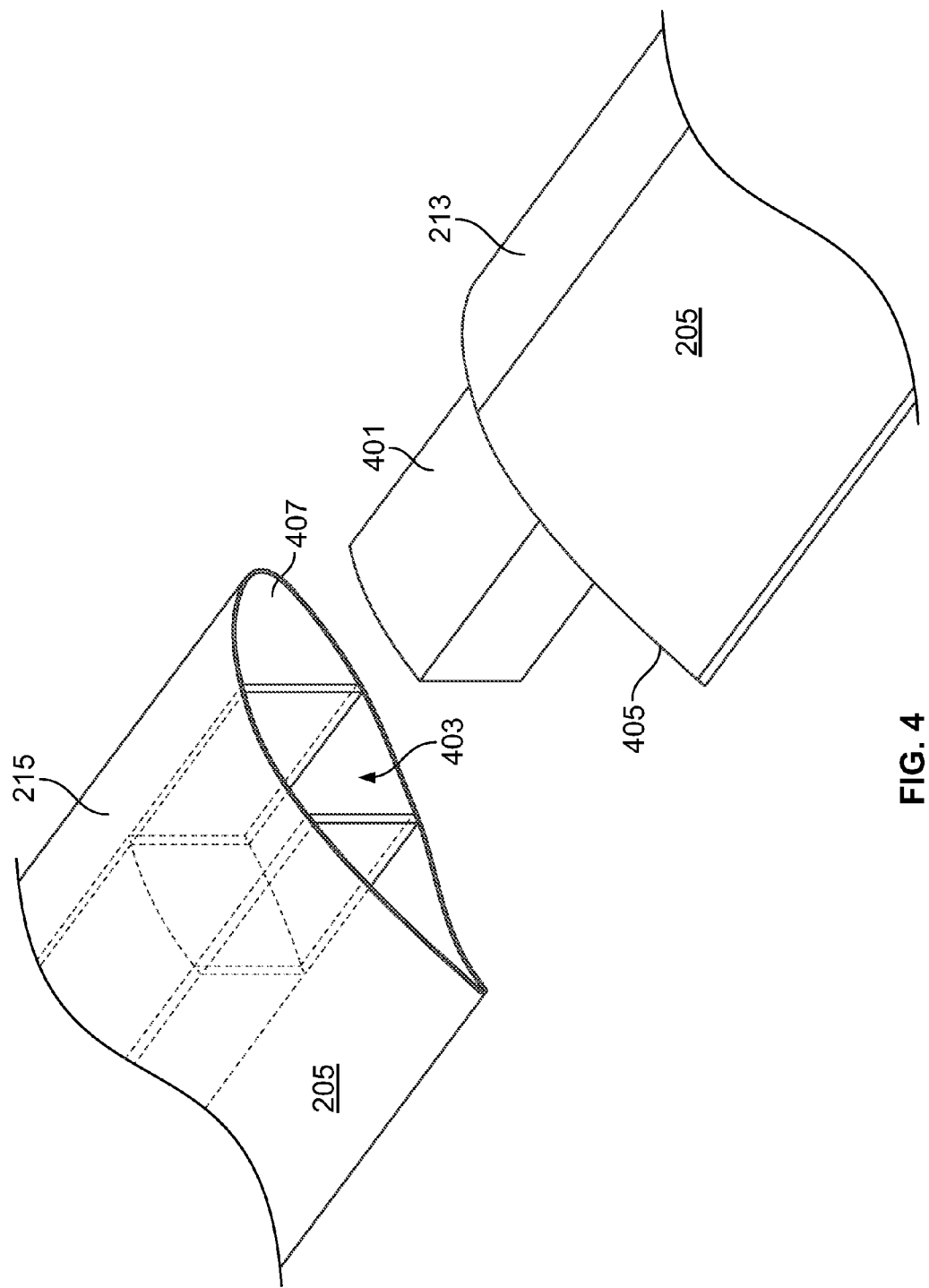
FIG. 4 shows a top perspective view of wind turbine blade segments configured to be joined together according to an embodiment of the present disclosure.

FIG. 4 shows a top perspective view of wind turbine blade segments configured to be joined together according to an embodiment of the present disclosure. As shown in FIG. 4, first segment 213 includes a protrusion 401 extending from of the airfoil portion 205. Protrusion 401 is an extension from the airfoil portion 205 that has a geometry configured to mate a mating cavity 403 of second segment 215. When mated, the first mating edge 405 of the first segment 213 contacts or is in close proximity to the second mating edge 407 of the second segment. Protrusion 401 and mating cavity 403 are not limited to the arrangement or geometry shown and may include features such as splines, latches, grooves or other features to assist in alignment or inconnection. In addition, the length of the protrusion 401 and the depth of the mating cavity 403 are not limited any may include any arrangement that permits the joining together of the first segment 213 and the second segment 215 through an adhesive joint. The protrusion 401 and mating cavity 403 may be separate structures from the shear web 303 or may be integrated into the shear web 303. The construction of the protrusion 401 and mating cavity 403 may be any suitable construction for use with wind turbine blades 108 and may include composite materials or reinforcing materials, such as glass or carbon fiber reinforced composites, polyvinyl chloride (PVC) or balsa core, with epoxy or vinyl ester resin and having hardware such as bolts and alignment pins. The protrusion 401 and the mating cavity 403 preferably include a tapered geometry (see e.g. FIG. 5) wherein the tapered geometry includes an angled geometry. For example, the protrusion 401 preferably includes a decreasing cross-sectional area as the protrusion 401 extends from the airfoil portion 205. Correspondingly, the mating cavity 403 includes an increasing cross-sectional area from the interior to the second mating edge 407.

FIG. 5 shows a cross-sectional view of two wind turbine blade segments 213, 215 being directed together according to an embodiment of the present disclosure. As shown, the protrusion 401 and the mating cavity 403 have corresponding geometries that permit mating. Although FIG. 5 shows a tapered surface, the mating geometries are not so limited and may include any geometry that permits mating and allows the joining of the first segment 213 to the second segment 215. Further, the tampered surface shown in FIG. 5 is merely schematic and not limited to the taper shown. In order to join the first segment 213 to the second segment 215 a bonding grid 601 (see FIG. 6) may be used.

FIG. 6 shows a top view of a bonding grid 601 according to an embodiment of the present disclosure. As shown, the bonding grid 601 includes a substantially rectangular frame 603 surrounding a plurality of conduits 605 arranged into a grid geometry. The one or more conduits 605 are arranged to form a plurality of cells 607. The cells 607 define a space into which adhesive may be distributed. The size and geometry of the cells 607 are not limited to the size and geometry shown and may be selected based upon the type of adhesive used, the size of the segments being joined, or other factors that affect the uniformity of adhesive distribution. The one or more conduits 605 include opening 609 arranged along the edges of the cells 607. The openings 609 are configured to permit the injection of adhesive into the space defined by cell 607. As the cell 607 is open, the adhesive is permitted to contact any surfaces in contact with the frame 603 and/or the conduits 605. For example, when the first segment 213 and second segment 215 are brought together (see e.g., FIG. 9), surfaces of each of the first segment 213 and the second segment 215 are in contact with adhesive provided to cell 607.

In addition to openings 609, the cells 607 are arranged with one or more vents 611 that permit the escape of gas or air and allow the substantially complete filling of the cells 607 with adhesive. In addition, in certain embodiments of the invention, the one or more vents 611 may be monitored to determine whether adhesive is present and the cells are substantially filled. In addition, the one or more vents 611 may be provided with vacuum or reduced pressure to assist in the distribution of the adhesive. A port 613 may be provided at any suitable location along the frame 603 in order to allow the injections of adhesive into the bonding grid 601. The port 613 may be any structure capable of receiving adhesive and may include an extension or protrusion that permits the injection of adhesive when the first segment 213 and second segment are brought together (see e.g., FIG. 9). Adhesives suitable for use with the bonding grid includes any adhesive compositions known in the art for connecting composite materials. Suitable adhesive compositions include, but are not limited to, epoxy, polyester, methylacrylate, vinylester or other adhesive resin. Bonding grid 601 further includes an optional heating element 615 arranged along conduit 605.

FIG. 7 shows a cross-sectional view of frame 603 taken in direction 7-7 of FIG. 6. As is visible in FIG. 7, frame 603 preferably includes a seal 701 arranged along the edges to permit containment of adhesive within cells 607. The seal may be a foam, rubber, polymer or other compressible or deformable material suitable for providing sealing of adhesive, while being conformable to a surface of the first segment 213 and/or the second segment 215. The frame 603 desirably provides a uniform spacing between the first segment 213 and the second segment 215 across the bonding joint 211 by maintaining a frame thickness along the length of the bonding grid 601. The frame 603 can be made from polyvinyl chloride (PVC), acrylonitrile butadiene styrene (ABS) and/or chlorinated polyvinyl chloride (CPVC).

FIG. 8 shows a cross-sectional view taken in direction 8-8 of FIG. 6. As shown in FIG. 8, the conduit 605 includes an opening 609 arranged on edges thereof. The conduit may be a pipe, hose or other suitable structure capable of conveying adhesive. The conduit 605 is preferably a lightweight, inexpensive semi-rigid material capable of maintaining strength when incorporated into the assembled wind turbine blade 108. For example, the conduit 605 maybe a butyl, nitrile, neoprene and/or polyvinyl chloride piping material. The openings 609 are not limited to mere openings and may be configured in any suitable manner to distribute adhesive. For example, the openings 609 may be configured to a nozzle geometry to permit efficient distribution of the resin. In addition, the conduit 605 may include an optional heating element 615 arranged along one or more edges of the conduit 605. The heating element 615 may be utilized in low temperature ambient environments to maintain adhesive viscosity during injection or prevent freezing. In addition, heating element 615 may be utilized to assist or facilitate curing of the adhesive. The heating element 615 may be any suitable heating element. In one embodiment, the heating element 615 is an electrically resistive heater that is connectable to an exterior electrical source. The present invention is not limited to the resistive wire/heater and may include fluid heating, chemical heating or any other type of heating that provides temperature control to the adhesive. An alternate approach includes combining the frame 603 with the conduit 605 by means of adding intermittent spacing structures to the conduit. In this embodiment, the conduit 605 is flexible enough to provide the sealing function while spacers ensure a minimum gap.

Figure 9:
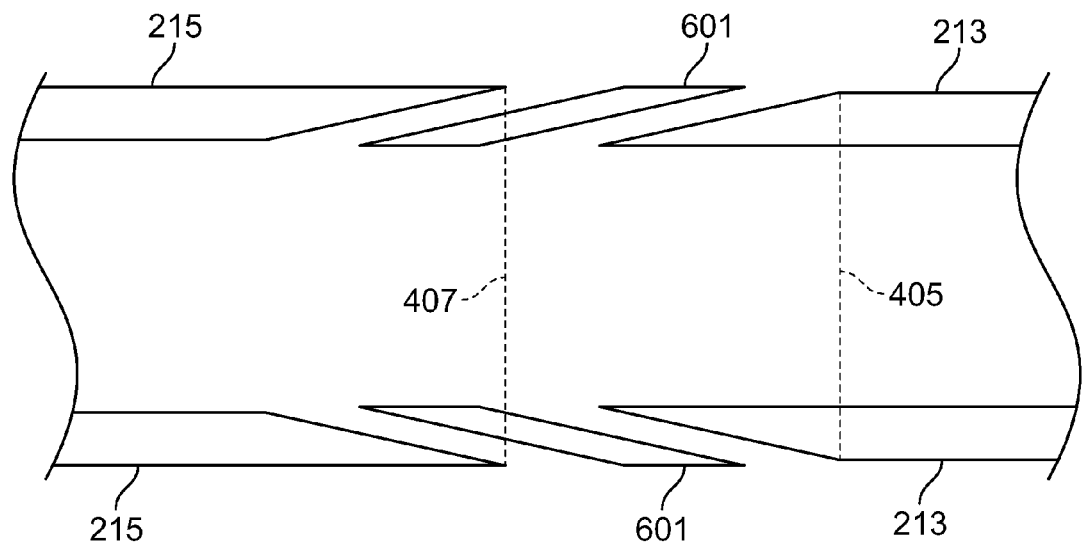
FIG. 9 shows a cross-sectional view of two wind turbine blade segments being directed together with a bonding grid according to an embodiment of the present disclosure.
Figure 10:
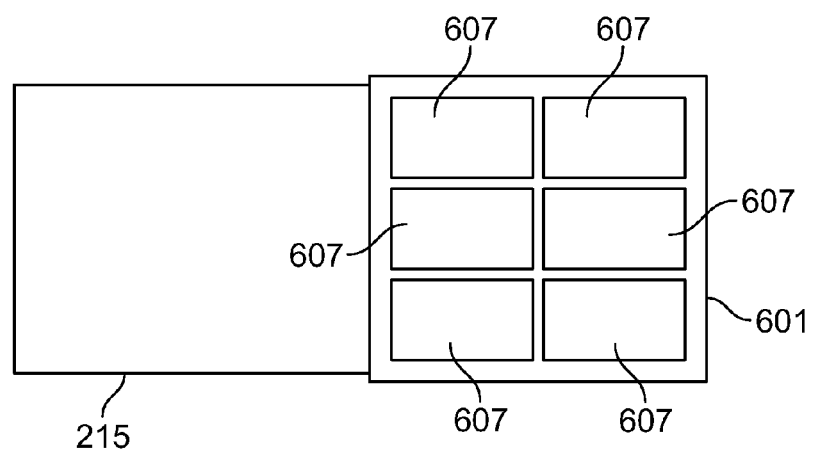
FIG. 10 shows a top view of a wind turbine segment having a bonding grid disposed thereon according to an embodiment of the present disclosure.

FIG. 9 shows a cross-sectional view of two wind turbine blade segments 213, 215 being directed together with a bonding grid 601 according to an embodiment of the present disclosure. The bonding grid 601 is intermediate to the first segment 213 and the second segment 215. The first segment 213 and the second segment 215 are brought into close proximity wherein the bonding grid 601 is configured to contact both the first segment 213 and second segment 215. The bonding grid 601 is preferably disposed on a surface of one of the first segment 213 or the second segment 215 prior to bringing the segments together (see e.g., FIG. 10). FIG. 10 shows a top view of a wind turbine segment having a bonding grid 601 disposed thereon according to an embodiment of the present disclosure. When mated, the first mating edge 405 of the first segment 213 contacts or is in close proximity to the second mating edge 407 of the second segment, forming a substantially continuous surface on the outer surface of wind turbine blade 108 (see e.g., FIG. 2).

In one embodiment, the first segment 213 and second segment 215 are each in a sealed contact with the bonding grid by contacting and/or compressing the seal 701 of the frame 603 of the bonding grid 601. Adhesive is provided to the bonding grid 601 via port 613 (see e.g., FIG. 6). The adhesive is distributed to cells 607. The adhesive is provided until the cells 607 are substantially full. Once the adhesive is sufficiently distributed, the adhesive may be cured. "Cure", "cured", "curing" and grammatical variations thereof as utilized herein mean that the adhesive is permitted to dry and/or cross-link sufficiently to provide an adhesive bond. Curing may be at ambient temperatures or elevated temperatures. In addition curing may be in the presence or absence of a catalyst. The bonding grid 601 is preferably incorporated into the bonding joint and remains in place subsequent to curing.

Figure 11:
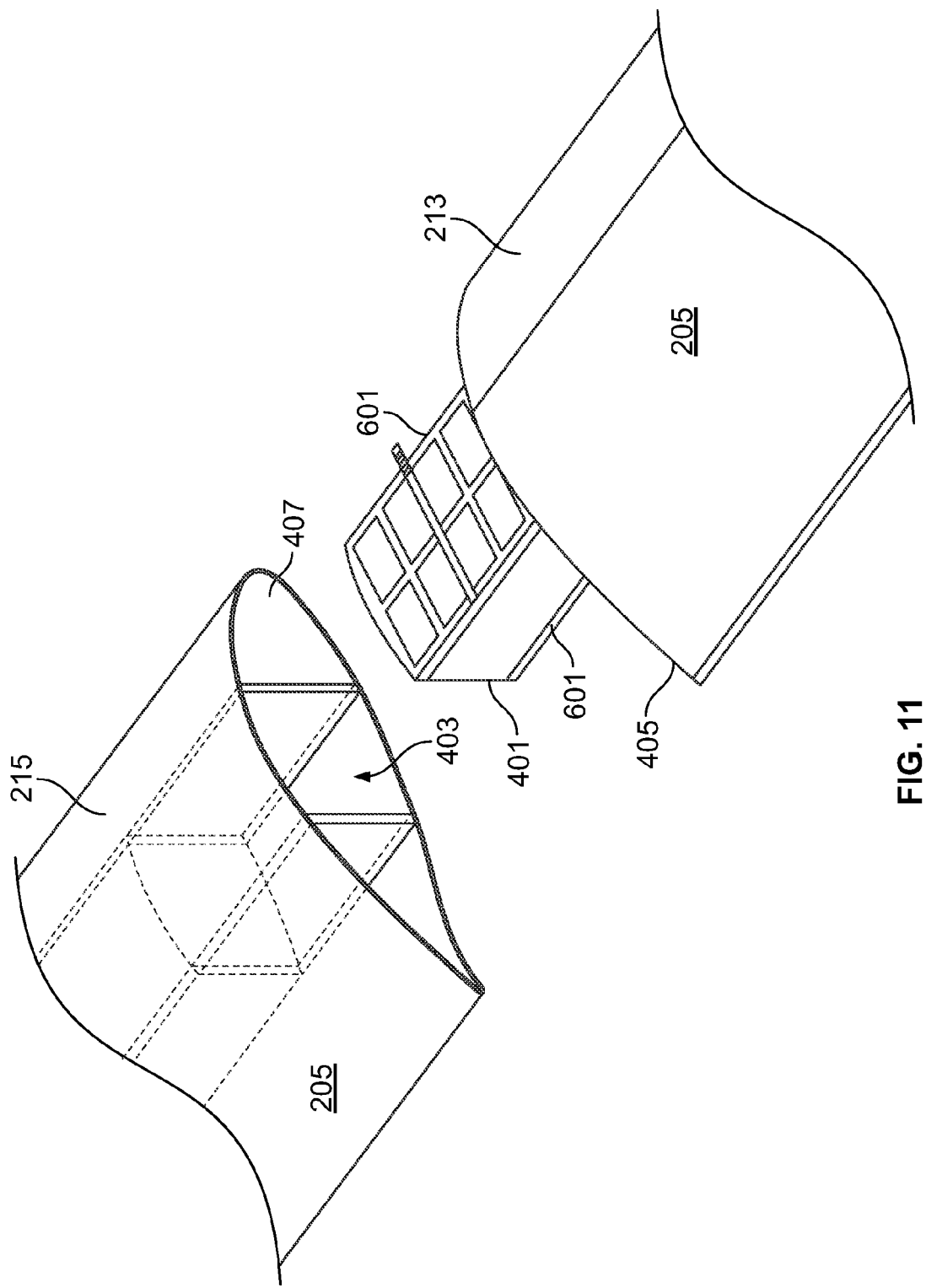
FIG. 11 shows a top perspective view of wind turbine blade segments configured to be joined together with a bonding grid disposed on surfaces of one wind turbine blade segment according to an embodiment of the present disclosure.
Figure 12:
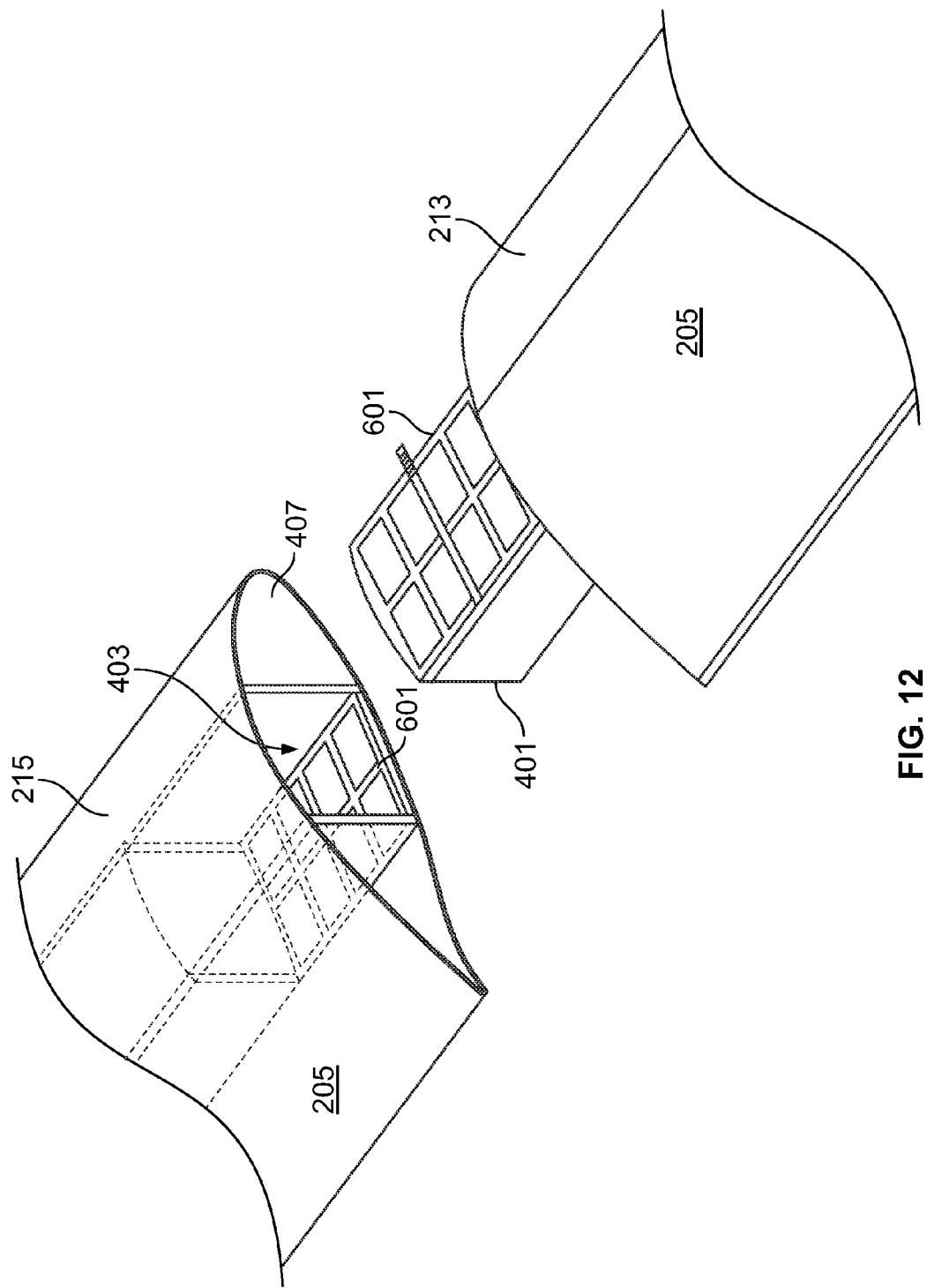
FIG. 12 shows a top perspective view of wind turbine blade segments configured to be joined together with a bonding grid disposed on surfaces of two wind turbine blade segments according to an embodiment of the present disclosure.

FIGS. 11 and 12 show alternate arrangements of the bonding grid 601 prior to joining the first segment 213 to the second segment 215. FIG. 11 shows a top perspective view of wind turbine blade segments 213, 215 configured to be joined together with a bonding grid 601 disposed on surfaces of one wind turbine blade segment 213 according to an embodiment of the present disclosure. FIG. 12 shows a top perspective view of wind turbine blade segments 213, 215 configured to be joined together with a bonding grid 601 disposed on surfaces of two wind turbine blade segments according to an embodiment of the present disclosure. The present disclosure is not limited to the arrangement shown in FIGS. 11 and 12, but may include disposing the bonding grid on one, two, three or more surfaces of either or both of first segment 213 and/or second segment 215. Further, the bonding grid may be initially adhered to the surface of first segment 213 and/or second segment 215 prior to joining the first segment 213 to the second segment.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for assembling large wind turbine blades comprising:
    providing a plurality of wind turbine blade segments;
    disposing an adhesive distribution arrangement on a surface of at least one of the plurality of the wind turbine blade segments, the adhesive distribution arrangement comprising a bonding grid having a plurality of adhesive distribution openings;

directing the wind turbine blade segments together;

providing sufficient adhesive to the bonding grid to substantially fill an area between the wind turbine segments; and curing the adhesive to form a bonded joint, the bonding grid being incorporated into the bonded joint.

2. The method of claim 1, wherein the bonding grid includes a port for receiving adhesive and a frame, the bonding grid being configured to deliver adhesive to the plurality of adhesive distribution openings, the distribution openings being configured to distribute adhesive onto one or more surfaces of a wind turbine blade segment.

3. The method of claim 1, wherein the grid further comprises a seal.

4. The method of claim 1, wherein the grid further comprises a frame arranged into a grid geometry.

5. The method of claim 4, wherein the grid geometry includes a plurality of cells into which adhesive is capable of being distributed.

6. The method of claim 4, wherein the frame is made up of one or more conduits.

7. The method of claim 6, wherein the conduits further comprise a heating element.

8. The method of claim 1, wherein the bonding grid further comprises one or more vents.

9. An adhesive distribution arrangement for assembling large wind turbine blades comprising:

a bonding grid having a port for receiving adhesive and a frame, the bonding grid being configured to deliver adhesive to a plurality of adhesive distribution openings, the distribution openings being configured to distribute adhesive onto one or more surfaces of a wind turbine blade segment, wherein the adhesive distribution arrangement is disposed on one or more surfaces of the wind turbine blade segment and becomes part of the assembled large wind turbine blade.

10. The arrangement of claim 9, wherein the grid further comprises a seal.

11. The arrangement of claim 9, wherein the frame is arranged into a grid geometry.

12. The arrangement of claim 11, wherein the grid geometry includes a plurality of cells into which adhesive is capable of being distributed.

13. The arrangement of claim 9, wherein the frame is made up of one or more conduits.

14. The arrangement of claim 13, wherein the conduits further comprise a heating element.

15. The arrangement of claim 9, wherein the bonding grid further comprises one or more vents.

16. A segmented wind turbine blade comprising:

a first wind turbine blade segment and a second wind turbine blade segment, the first wind turbine blade segment being joined to the second wind turbine blade segment;

a bonding grid disposed between adjacent surfaces of the first wind turbine blade segment and the second wind turbine blade segment, the bonding grid including a frame having a plurality of cells disposed therein, the cells being substantially filled with cured adhesive; and wherein the distribution of adhesive is substantially uniform across the adjacent surfaces.

17. The wind turbine blade of claim 16, wherein the wind turbine blade comprises two segments.

18. The wind turbine blade of claim 16, wherein the wind turbine blade comprises three or more segments.

* * * * *